(12) United States Patent
Brower et al.

(10) Patent No.: US 6,953,527 B2
(45) Date of Patent: Oct. 11, 2005

(54) FUEL TANK WITH WATER TRAP

(75) Inventors: David R. Brower, Beaver Dam, WI (US); Kevin D. Steffes, Fond du Lac, WI (US)

(73) Assignee: Tecumseh Products Company, Tecumseh, MI (US)

( * ) Notice: Subject to any disclaimer, the term of this patent is extended or adjusted under 35 U.S.C. 154(b) by 14 days.

(21) Appl. No.: 10/370,295

(22) Filed: Feb. 17, 2003

(65) Prior Publication Data

US 2004/0159602 A1 Aug. 19, 2004

(51) Int. Cl.[7] .............................................. B01D 35/027
(52) U.S. Cl. ....................... 210/295; 210/299; 210/313; 210/305; 210/172; 210/506
(58) Field of Search ................... 210/172, 506, 210/295, 313, 299, 305

(56) References Cited

U.S. PATENT DOCUMENTS

| | | | | |
|---|---|---|---|---|
| 1,055,744 A | * | 3/1913 | Hans | 210/305 |
| 1,058,133 A | * | 4/1913 | Yourtree | 210/313 |
| 1,083,413 A | * | 1/1914 | Smith | 210/313 |
| 1,113,683 A | * | 10/1914 | Pfahler | 210/313 |
| 1,157,643 A | | 10/1915 | Kuhn | |
| 1,305,355 A | | 6/1919 | Gulick | |
| 1,518,686 A | | 12/1924 | Bland | |
| 1,623,728 A | | 4/1927 | Hooton | |
| 2,002,407 A | | 5/1935 | Lemke | 210/57 |
| 2,253,509 A | * | 8/1941 | Dort | 210/148 |
| 2,339,303 A | | 1/1944 | Tillery | 220/1 |
| 2,770,362 A | * | 11/1956 | Paquin | 210/304 |
| 2,788,125 A | * | 4/1957 | Webb | 210/172 |
| 2,905,327 A | * | 9/1959 | Phillips | 210/463 |
| 3,826,372 A | * | 7/1974 | Bell | 210/172 |
| 3,925,747 A | * | 12/1975 | Woodward et al. | 338/33 |
| 4,107,052 A | | 8/1978 | Yoshino et al. | 210/534 |
| 4,304,664 A | * | 12/1981 | McAlindon et al. | 210/172 |
| 4,595,030 A | | 6/1986 | Yazaki | 137/203 |
| 4,626,347 A | * | 12/1986 | Neglio | 210/232 |

* cited by examiner

Primary Examiner—Thomas M. Lithgow
(74) Attorney, Agent, or Firm—Baker & Daniels

(57) ABSTRACT

A fuel tank for use with small internal combustion engines, the fuel tank having an inlet and an outlet and storing a quantity of fuel therein. A hydrophobic barrier is positioned within the fuel tank in flow communication with the outlet, and permits the passage of fuel therethrough while preventing the passage of water therethrough. In this manner, water is prevented from entering the intake system of the engine. The hydrophobic barrier may be positioned at an inclined angle proximate the fuel outlet, such that water droplets within the fuel are deflected downwardly toward the lower portion of the fuel tank. The fuel tank includes a lower wall with a depressed area defining a water trap in which water may collect, the water trap spaced laterally away from the fuel outlet and the fuel inlet.

21 Claims, 2 Drawing Sheets

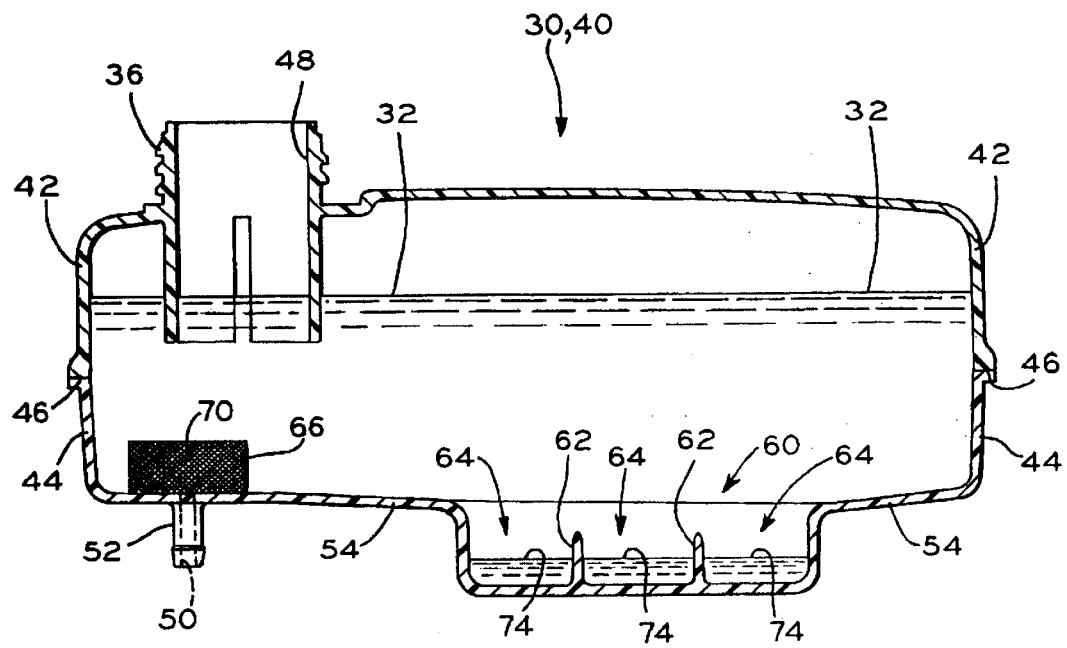
FIG._3
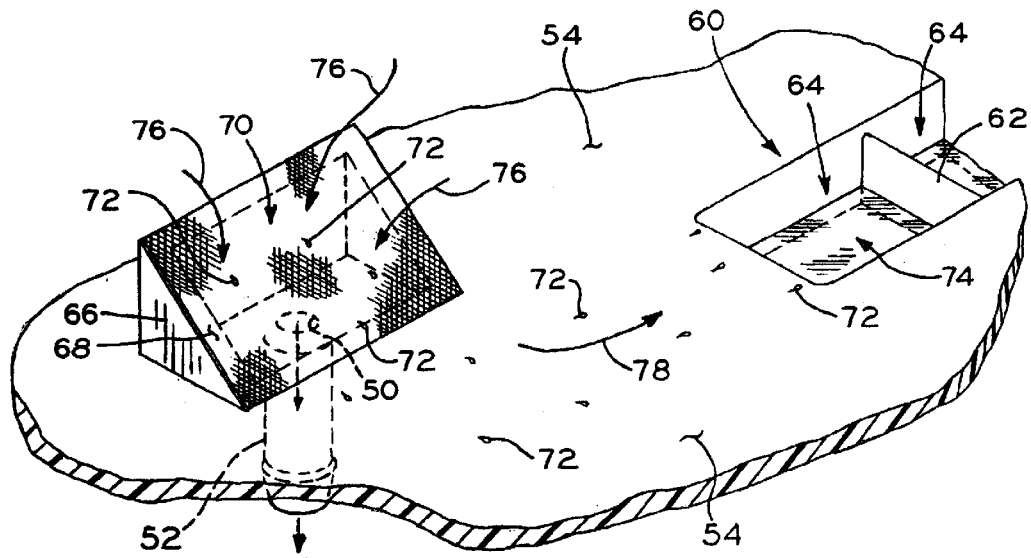
FIG._4

FUEL TANK WITH WATER TRAP

BACKGROUND OF THE INVENTION

1. Field of the Invention

The present invention relates to small internal combustion engines, of the type commonly used with lawnmowers, lawn and garden tractors, other working implements, or sport vehicles. In particular, the present invention relates to fuel tanks for such engines.

2. Description of the Related Art

In small internal combustion engines, fuel is typically stored in a fuel tank connected to the engine housing. The fuel tank includes a filler neck with a cap screw-threaded on the filler neck, the cap removable to permit filling of liquid fuel into the fuel tank. An outlet, usually located in the lower portion of the fuel tank, is connected in a suitable manner to an air/fuel mixing device, such as a carburetor or a fuel injector. The fuel tank supplies fuel to the air/fuel mixing device, and the air/fuel mixing device forms an air/fuel intake mixture and delivers the mixture to the intake system of the engine for combustion. During running of the engine, fuel is continuously drawn from the fuel tank by the air/fuel mixing device.

Fuel which is used with small internal combustion engines may occasionally contain a small amount of moisture therein, usually in the form of small droplets of liquid water. Also, it is possible that moisture may enter the fuel tank when same is open, such as when fuel is being filled into the fuel tank, particularly if the engine is used in a highly humid environment or if rain or snow are present. Problematically, moisture in the fuel tank, if allowed to enter the intake system of the engine during combustion, may inhibit good engine performance.

Some known fuel tanks, particularly those used in connection with large engines, include a water trap in a lower portion of the fuel tank. Water droplets, which are more dense than fuel, tend to separate from the fuel and accumulate in the water trap. Some water traps are equipped with valves which may be opened from time to time to drain accumulated water from the water trap. Although these water trap features are useful in collecting water in fuel tanks, same have not proven entirely satisfactory for preventing water from being drawn with the fuel supply from the fuel tank and into the intake system of the engine.

It is therefore desirable to provide a fuel tank for small internal combustion engines, in which any water within the fuel in the tank is prevented from being drawn into the intake system of the engine during running of the engine.

SUMMARY OF THE INVENTION

The present invention provides a fuel tank for use with small internal combustion engines, the fuel tank having an inlet and an outlet and storing a quantity of fuel therein. A hydrophobic barrier is positioned within the fuel tank in flow communication with the outlet, and permits the passage of fuel therethrough while preventing the passage of water therethrough. In this manner, water is prevented from entering the intake system of the engine. The hydrophobic barrier is preferably positioned at an inclined angle proximate the fuel outlet, such that water droplets within the fuel are deflected downwardly toward the lower portion of the fuel tank. The fuel tank includes a lower wall with a depressed area defining a water trap in which water may collect, the water trap spaced laterally away from the fuel outlet and the fuel inlet.

The hydrophobic barrier may include a relatively thin screen or membrane having openings which permit the passage of fuel through the barrier, yet block the passage of water droplets. Further, the hydrophobic barrier may have a water-resistant, non-wettable surface such that water droplets which are repelled by the barrier slide down the inclined surface of the barrier. Thereafter, the sloped lower wall of the fuel tank directs the water droplets to migrate toward the water trap, where the water droplets are collected.

The water trap may be formed as a depression within the lower wall of the fuel tank, with the remainder of the lower wall being sloped downwardly to guide water droplets into the water trap. The water trap may additionally include a plurality of baffles therein, dividing the water trap into a plurality of chambers. The baffles divide the volume of water in the water trap into sub-volumes which are respectively disposed within the chambers, which dampens or prevents water within the water trap from sloshing about if the engine is inclined during use, or as a result of vibrations in the fuel tank caused by the running engine. In this manner, the water which is collected in the water trap does not easily mix into the fuel within the tank.

Additionally, the water trap is laterally spaced from the fuel inlet, preventing a user of the engine from viewing the water within the water trap when the fuel tank is empty of fuel, and thereby mistakenly believing that fuel remains within the fuel tank. The lateral spacing of the water trap from the fuel inlet also prevents a fuel stream from directly contacting, agitating, and mixing with the water in the water trap as fuel is filled into the tank.

Advantageously, the hydrophobic barrier allows fuel to be drawn therethrough, and through the fuel tank outlet to the intake system of the engine, while preventing the passage of water from the fuel tank. Simultaneously, the hydrophobic barrier deflects water droplets toward the water trap where same are collected. In this manner, water within the fuel tank is prevented from entering the intake system of the engine.

In one form thereof, the present invention provides a fuel tank, including a fuel tank body having an inlet and an outlet; and a hydrophobic barrier disposed within the fuel tank body, the hydrophobic barrier in flow communication with the outlet.

In another form thereof, the present invention provides a fuel tank, including a fuel tank body having an inlet and an outlet; a water trap disposed in a lower portion of the fuel tank body; and a hydrophobic barrier disposed within the fuel tank body, the hydrophobic barrier in flow communication with the outlet.

In a further form thereof, the present invention provides an internal combustion engine, including an engine housing; and a fuel tank mounted on the engine housing, the fuel tank including a fuel tank body having an inlet and an outlet; and a hydrophobic barrier disposed within the fuel tank body, the hydrophobic barrier in flow communication with the outlet.

BRIEF DESCRIPTION OF THE DRAWINGS

The above-mentioned and other features and advantages of this invention, and the manner of attaining them, will become more apparent and the invention itself will be better understood by reference to the following description of an embodiment of the invention taken in conjunction with the accompanying drawings, wherein:

FIG. 3 is a sectional view taken along line 3—3 of FIG. 2; and

FIG. 4 is a fragmentary view of a portion of the interior of the fuel tank, showing the fuel outlet and hydrophobic barrier, as well as a portion of the water trap.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION

Figures 1, 2:
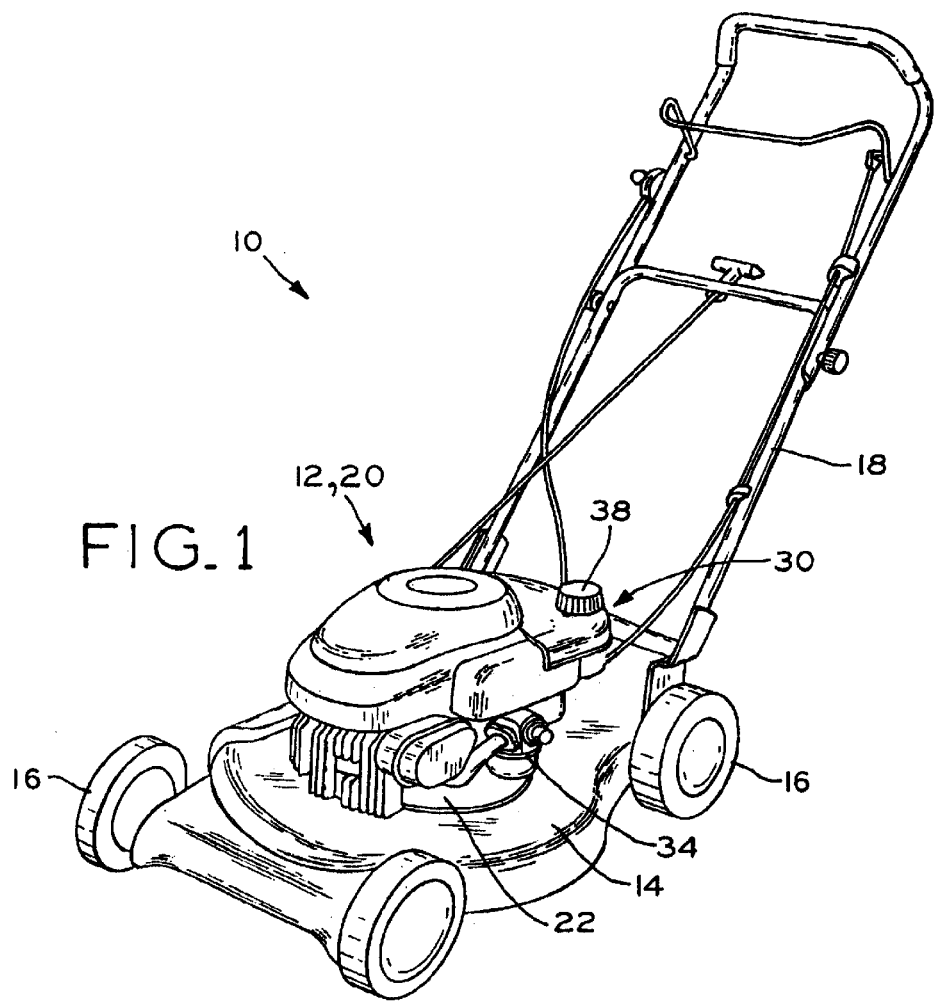
FIG. 1 is a perspective view of a lawnmower having a small internal combustion engine, the engine having a fuel tank in accordance with the present invention.
FIG. 2 is a rear perspective view of the fuel tank of the engine of FIG. 1, the fuel tank cut away at two locations to show the hydrophobic barrier and the water trap therein.

Referring to FIG. 1, an exemplary implement is shown in the form of lawnmower 10, including a small internal combustion engine 12 mounted upon deck 14 of lawnmower 10. Lawnmower 10 additionally includes wheels 16, as well as handle 18 connected to deck 14 such that lawnmower 10 may be pushed about by an operator. Engine 12 may be a small single or twin-cylinder engine, for example, such as those disclosed in U.S. Pat. Nos. 6,276,324, 6,279,522, 6,295,959, and 6,499,453, each assigned to the assignee of the present invention, the disclosures of which are incorporated herein by reference. Engine 12 includes an engine housing 20 with a crankcase 22 having a crankshaft (not shown) rotatably disposed therein, the crankshaft driven by one or more conventional piston and connecting rod assemblies (not shown) each including a piston reciprocating within a cylinder within engine 12. The crankshaft includes a lower end protruding externally of engine 12 beneath deck 14, to which is secured a cutting blade (not shown).

Engine 12 additionally includes fuel tank 30 mounted to engine housing 20. Fuel tank 30 contains a volume of liquid fuel 32 (FIG. 3) therein, such as gasoline. The fuel is supplied from fuel tank 30 to an air/fuel mixing device such as carburetor 34 of engine 12, which combines the fuel with intake air to form an air/fuel mixture for combustion within engine 12. Engine 12 may alternatively include a fuel injector (not shown) in the place of carburetor 34. Although fuel tank 30 is shown herein mounted to engine 12 associated with lawnmower 10, it should be understood that fuel tank 30, described in detail below, may be used with any small internal combustion engine of the type used with lawn and garden tractors, snow throwers, other working implements, or sport vehicles, for example.

Fuel tank 30 includes filler neck 36 (FIG. 2) having cap 38 screw-threaded thereon. Cap 38 may be removed as necessary for filling fuel into fuel tank 30. In addition to fuel, small amounts of moisture, such as water droplets, are occasionally present within fuel tank 30. The moisture may be contained within the fuel itself, or may enter fuel tank 30 in another manner, such as when engine 12 is used in a humid environment, or when engine 12 is used when rain or snow are present. It is desirable that moisture not enter the intake system of engine 12, and fuel tank 30 of the present invention, as discussed below, prevents moisture from exiting fuel tank 30 and being drawn into the intake system of engine 12.

Referring to FIGS. 2 and 3, fuel tank 30 generally includes fuel tank body 40 defined by upper portion 42 and lower portion 44. Upper portion 42 and lower portion 44 may be made from metal, or may be molded from a suitable plastic such as polypropylene, for example. Upper portion 42 and lower portion 44 are joined to one another at seam 46 in a suitable manner, such as by welding, heat bonding, or adhesive, for example. Upper portion 42 includes an inlet 48, shown herein as filler neck 36 having cap 38 screw-threaded thereon. Lower portion 44 includes outlet 50, shown herein as fitting 52, to which a fuel line (not shown) may be attached for conducting fuel from fuel tank 30 to carburetor 34. Lower portion 44 additionally includes lower wall 54, which generally slopes downwardly toward the central portion thereof, as described below.

Lower wall 54 includes water trap 60 therein which, as shown in FIGS. 2–4, is integrally formed within lower portion 44 of fuel tank 30 as a depression or recess within lower wall 54. Alternatively, water trap 60 may be a separate component mounted to lower wall 54 in communication with the interior of fuel tank 30. In this manner, water trap 60 is the lowest portion within the interior volume of fuel tank 30. A plurality of baffles 62 are disposed within water trap 60, which may be integrally formed with water trap 60. Baffles 62 divide water trap 60 into a plurality of chambers or compartments 64, the function of which will be explained below.

Referring to FIGS. 3 and 4, support structure 66 projects upwardly from lower wall 54 of lower portion 44 of fuel tank 30, and is disposed generally above outlet 50. Support structure 66 may be integrally formed with lower portion 44 of fuel tank 30, or alternatively, may comprise a separate component attached to lower wall 54 of lower portion 44. Support structure 66 surrounds outlet 50, and has an inclined profile defining an inclined attachment face 68 to which hydrophobic barrier 70 is secured. Hydrophobic barrier 70, as discussed below, is a permeable material in flow communication with outlet 50, which allows the passage of fuel therethrough, yet blocks the passage of water therethrough. Hydrophobic barrier 70 may be secured to attachment face 68 of support structure 66 across outlet 50 by welding, heat bonding, adhesive, or any other suitable manner. As shown in FIGS. 3 and 4, hydrophobic barrier 70 is disposed proximate outlet 50 and above, or in front of, outlet 50.

One suitable material for hydrophobic barrier 70 is Product No. 03-75/34, a hydrophobic, permeable nylon PA 6,6 membrane which is available from Sefar America, Inc., 111 Calumet Street, Depew, N.Y. 14043. The foregoing membrane has openings therein of 75 microns nominal size, and the surface area of the membrane is approximately 34.0% open. Alternatively, hydrophobic barrier 70 may be formed of a substrate, such as a metal mesh or screen having a plurality of small openings, the substrate coated with a water-repellant coating of a suitable non-polar polymeric material such as a fluoropolymer, nylon, or silicone, for example. One suitable such coating is a Teflon® material, available from E.I. Du Pont de Nemours and Company. 100271 Gasoline, a fuel typically used in small internal combustion engines, is generally a complex mixture of hydrocarbons. These hydrocarbons have a relatively large molecular size in relation to individual water molecules. However, as is well known in the chemical art, the hydrogen bonding effect which is observed between individual water molecules causes water molecules to strongly attract to one another, such that individual water molecules will tightly agglomerate into droplets. Such droplets may be much larger than the individual hydrocarbon molecules of the fuel, and may be visible to the eye. In this manner, the openings of hydrophobic barrier 70 are sized to permit the passage of fuel therethrough, yet to block the passage of water droplets therethrough.

Further, hydrophobic barrier 70 may have a surface made from a non-polar material which is water-repellant, or non-wettable, such that water droplets cannot wet across the surface of hydrophobic barrier 70 but rather are repelled from the surface of hydrophobic barrier 70.

Referring to FIGS. 2–4, because water droplets within fuel 32 are more dense than the fuel itself, water droplets thereby tend to separate by gravity from fuel 32 and collect within water trap 60, which defines the lowermost area within lower portion 44 of fuel tank 30. Lower wall 54 of lower portion 44 of fuel tank 30 is inclined or sloped downwardly toward water trap 60, thereby guiding water droplets toward water trap 60. In this manner, as shown in FIG. 4, water droplets 72 gradually migrate by gravity along the direction of arrow 78, for example, toward water trap 60, where the water droplets 72 collect and combine with one another to form a volume of water 74 within water trap 60.

Additionally, as may be seen in FIGS. 2–4, during running of engine 12, fuel is drawn through outlet 50 from an area within the interior of fuel tank 30 which is laterally spaced away from water trap 60, thereby minimizing the likelihood that water from volume 74 within water trap 60 will be drawn toward hydrophobic barrier 70. As shown schematically in FIG. 4 by arrows 76, fuel passes through hydrophobic barrier 70 and exits fuel tank 30 through outlet 50 to carburetor 34 (FIG. 1). Any water droplets 72 within the fuel stream are blocked by hydrophobic barrier 70 and, upon contact with the inclined, non-wettable surface of hydrophobic barrier 70, the water droplets 72 slide by gravity downwardly off of hydrophobic barrier 70 and onto lower wall 54 of fuel tank 30, where same are subsequently guided toward water trap 60 by the slope of lower wall 54 along the direction of arrow 78. In this manner, hydrophobic barrier 70 prevents water droplets 72 from exiting fuel tank 30 and being drawn into the intake system of engine 12.

Referring to FIG. 3, baffles 62 separate the volume of water 74 in water trap 60 into the several sub-volumes which are respectively disposed within compartments 64. This distribution of water volume 74 dampens the effect of water "sloshing" about within water trap 60 and potentially re-mixing with the fuel 32 within fuel tank 30, such as when engine 12 is moved between slight inclines during use, or as a result of vibrations experienced within fuel tank 30 during running of engine 12.

As shown in FIGS. 2 and 3, water trap 60 is laterally spaced a distance from inlet 48, such that an operator of lawnmower 10 or any other implement with which fuel tank 30 is used, is prevented from viewing any water which may collect within water trap 60 when looking through inlet 48 into the interior of fuel tank 30. Thus, the operator will not mistakenly believe that fuel 32 remains within fuel tank 30 when fuel tank 30 is actually empty of fuel. Also, as fuel 32 is filled into fuel tank 30 from an external container in the form of a fuel stream, the lateral spacing of water trap 60 from inlet 48 prevents the fuel stream from directly contacting, agitating, and mixing with water within water trap 60. The lateral spacing of water trap 60 from outlet 50 also facilitates the drawing of fuel 32 from a portion of the interior of fuel tank 30 which is disposed away from water trap 60.

As only a minimal amount of moisture typically enters the interior of fuel tank 30 during use of engine 12, it is contemplated that water trap 60 will collect a volume of water 74 therein only very gradually during the operational life of engine 12. Thus, engine 12 will likely reach the end of its operational life before a significant volume of water 74 collects within water trap 60. However, water within water trap 60 might gradually evaporate and exit fuel tank 30, such as between the threads of fuel tank cap 38 and filler neck 36, for example, when fuel tank 30 is empty of fuel, such as when the implement with which engine 12 is associated is stored during the off-season.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A fuel tank, comprising:
   a fuel tank body having a lower wall, an inlet and an outlet, said outlet formed in said fuel tank body lower wall;
   a water trap disposed in a lower portion of said fuel tank body and defined by a depression integrally formed within said lower wall, said lower wall sloped downwardly toward said depression, said water trap laterally spaced from said outlet, and said water trap laterally spaced from said inlet; and
   a hydrophobic barrier attached to said lower wall within said fuel tank body, and disposed over said outlet, said water trap positioned lower than said outlet.

2. The fuel tank of claim 1, wherein said water trap includes a plurality of baffles therein, said baffles separating said water trap into a plurality of chambers.

3. The fuel tank of claim 1, wherein said hydrophobic barrier comprises a permeable material having openings therein dimensioned to permit the flow of fuel therethrough and to block substantially the flow of water therethrough.

4. The fuel tank of claim 1, wherein said hydrophobic barrier is positioned proximate said outlet and in front of said outlet.

5. The fuel tank of claim 1, wherein said hydrophobic barrier comprises a porous membrane made of a non-polar polymeric material.

6. The fuel tank of claim 1, wherein said outlet is disposed proximate a lower portion of said fuel tank body and said hydrophobic barrier is disposed at an inclined angle relative to said outlet, whereby water within said fuel tank body is deflected away from said outlet towards said water trap.

7. The fuel tank of claim 1, wherein said hydrophobic barrier comprises a porous substrate with a hydrophobic coating, said coating selected from the group of coatings consisting of fluoropolymer coatings, nylon coatings, and silicone coatings.

8. The fuel tank of claim 1, wherein said hydrophobic barrier is integrally formed with said lower wall of said fuel tank body.

9. The fuel tank of claim 1, wherein said water trap is not visible through said inlet.

10. The fuel tank of claim 1, wherein said lower portion of said fuel tank body and said water trap comprise a unitary structure.

11. An internal combustion engine, comprising:
    an engine housing; and
    a fuel tank mounted on said engine housing, said fuel tank comprising:
       a fuel tank body having a lower wall, an inlet and an outlet, said outlet formed in said fuel tank body lower wall;
       a water trap disposed in a lower portion of said fuel tank body and defined by a depression integrally formed within said lower wall, said lower wall sloped downwardly toward said depression, said water trap laterally spaced from said outlet, and said water trap laterally spaced from said inlet; and a hydrophobic barrier attached to said lower wall within said fuel tank body, and disposed over said outlet, said water trap positioned lower than said outlet.

12. The internal combustion engine of claim 11, wherein said hydrophobic barrier comprises a permeable material having openings therein dimensioned to permit the flow of fuel therethrough and to block substantially the flow of water therethrough.

13. The internal combustion engine of claim 11, wherein said hydrophobic barrier comprises a porous membrane made of a non-polar polymeric material.

14. The internal combustion engine of claim 11, wherein said water trap includes a plurality of baffles therein, said baffles separating said water trap into a plurality of chambers.

15. The internal combustion engine of claim 11, wherein said hydrophobic barrier is disposed at an inclined angle relative to said outlet, whereby water within said fuel tank body is deflected away from said outlet towards said water trap.

16. The internal combustion engine of claim 11, wherein said hydrophobic barrier is positioned proximate said outlet and in front of said outlet.

17. The internal combustion engine of claim 11, wherein said hydrophobic barrier comprises a porous substrate with a hydrophobic coating, said coating selected from the group of coatings consisting of fluoropolymer coatings, nylon coatings, and silicone coatings.

18. The internal combustion engine of claim 11 wherein said hydrophobic barrier is integrally formed with said lower wall of said fuel tank body.

19. The internal combustion engine of claim 11, wherein said water trap is not visible through said inlet.

20. The internal combustion engine of claim 11, wherein said lower portion of said fuel tank body and said water trap comprise a unitary structure.

21. A fuel tank, comprising:

a fuel tank body having an inlet and an outlet, said outlet disposed in a lower portion of said fuel tank body;

a water trap disposed in said lower portion of said fuel tank body, said water trap laterally spaced from said outlet, and said water trap laterally spaced from said inlet, such that said water trap is not visible through said inlet; and a hydrophobic barrier disposed within said fuel tank body, said hydrophobic barrier in flow communication with said outlet and disposed on a support structure connected to said lower portion of said fuel tank body.

* * * * *